H. PARKER.
DRYING MACHINE.
APPLICATION FILED APR. 13, 1916.

1,322,813.

Patented Nov. 25, 1919.
2 SHEETS—SHEET 1.

WITNESSES:

INVENTOR.
Howard Parker:
BY
his ATTORNEY.

H. PARKER.
DRYING MACHINE.
APPLICATION FILED APR. 13, 1916.
1,322,813.
Patented Nov. 25, 1919.
2 SHEETS—SHEET 2.
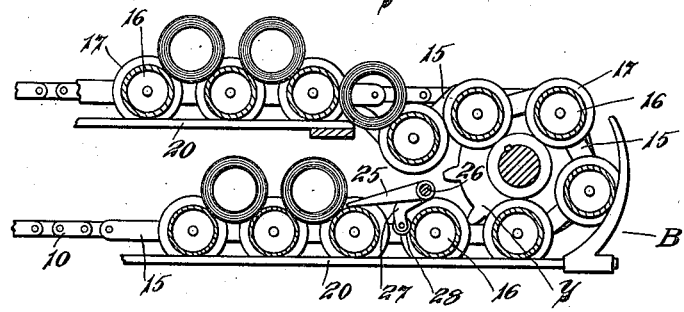
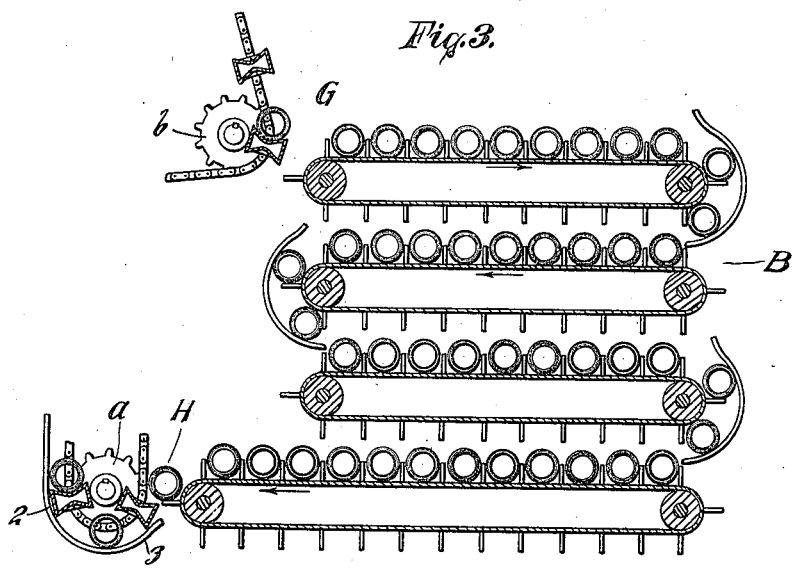
WITNESSES:
INVENTOR.
Howard Parker:
BY
his ATTORNEY.

UNITED STATES PATENT OFFICE.

HOWARD PARKER, OF BERLIN, NEW HAMPSHIRE, ASSIGNOR TO BROWN COMPANY, OF PORTLAND, MAINE, A CORPORATION OF MAINE.

DRYING-MACHINE.

1,322,813.      Specification of Letters Patent.      Patented Nov. 25, 1919.

Application filed April 13, 1916. Serial No. 90,807.

*To all whom it may concern:*

Be it known that I, HOWARD PARKER, citizen of the United States, and a resident of Berlin, in the county of Coos, State of New Hampshire, have invented certain new and useful Improvements in Drying-Machines, of which the following is a specification.

The object of this invention is to provide an apparatus for drying goods and materials of various sorts, but particularly articles which may be separately and individually handled. The particular embodiment of the invention selected for illustration and description represents a machine adapted for the handling of pipes or tubes made from pulp which come to the machine in a more or less wet state and are to be dried. These tubes are made of varying lengths, and in this case where the length is material it may be considered that 5 foot tubes are being handled.

In the drawings—

Fig. 2 is a detail view of the traveling carrier showing the method of transferring the tubes from one pass of the carrier to another.

Fig. 3 is a sectional view, somewhat diagrammatic, of a modification.

Figure 1:
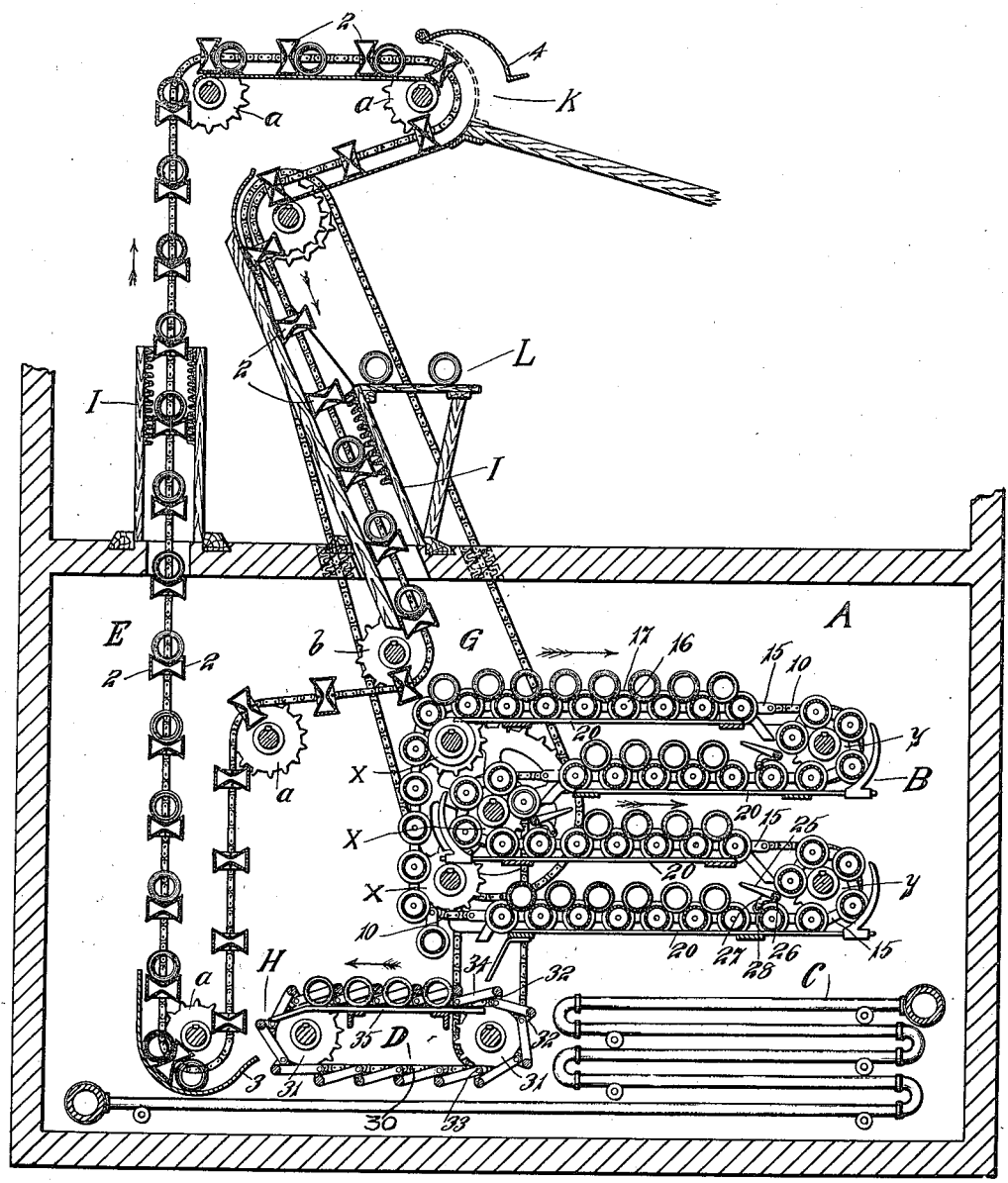
Figure 1 is a side elevation of a complete apparatus made in accordance with my invention shown in a more or less diagrammatic form.

The description of the invention will be of what is now believed to be the preferred embodiment, as illustrated in the drawings, and while for this purpose the description will be confined to the precise structure shown it will of course be understood that it is not the intention that this description shall have a limiting effect on the scope of the invention.

Referring to the drawings—A denotes the drying chamber; B, a traveling carrier mounted therein and adapted to support the pipes and move them rather slowly through the chamber until they are thoroughly dried. C denotes a source of heat; D, a transfer carrier which it is convenient to use to deliver the dried pipes to the conveyer E, whose path of travel within the drying chamber carries it adjacent to the receiving end of the carrier, as at G, and the delivery end of the carrier, as at H. Air-locks I, I, are provided where this conveyer passes through the walls of the drying chamber to prevent the escape of the heat.

Exterior of the drying chamber the conveyer discharges the dried pipes as at K, and the wet pipes are fed to the conveyer as at the supply point L. The direction of travel of the conveyer is indicated by the arrows. The conveyer travels at a faster rate of speed than does the carrier, passes into the drying chamber, delivers a pipe onto the carrier, then around to the delivery end of the carrier where it receives a dry pipe from the carrier and conveys it out of the drying chamber, discharging it at K.

This conveyer comprises endless chains spaced apart and connected by the buckets 2, both faces being recessed or concaved so that one face of the conveyer is used to support the wet pipes as they are carried into the drying chamber, and the other face is used to pick up the dried pipes and carry them out of the drying chamber. The dried pipes are delivered from the transfer carrier into a boot 3 which holds them in position to be picked up by the buckets 2. If it should be desired to pass the pipes a second time through the drying chamber the guard 4 at the discharge point may be lowered, as indicated in dotted lines, which would cause the pipes to travel around back into the drying chamber and be deposited on the carrier therein.

The sprockets $a$ are provided to carry the conveyer chains, and around the sprocket $b$ the direction of movement of the conveyer is abruptly changed in order to provide for the delivery of the wet pipes to the carrier at its receiving end. A suitable drive for one or more of these sprockets is provided, but not here shown.

The traveling carrier comprises a pair of chains 10, spaced apart a distance greater than the length of the pipes which are being dried so that these pipes can be dropped down between these chains, as will be hereinafter described. Suitable sprockets $x$, $x$, $x$, and $y$, $y$, are provided at either end of the drying chamber around which these chains travel, these sprockets being so arranged that the carrier is given a succession of horizontal reverse passes, by which is meant that adjacent passes are moving in opposite directions.

Pairs of links 15 are pivotally secured opposite to one another and pivoted at one end to the inside of the chains. At their free ends these links support rollers 16, flanged as at 17. These rollers are supported on tracks 20 arranged underneath each pass of the carrier but shorter than the full length of the pass, the flange 17 fitting down on the sides of the tracks to keep the rollers moving. Each of the rollers 16 is supported by the chains independently of the other rollers, and they are sufficiently near together so that a pipe will rest between two adjacent rollers, as clearly seen in Fig. 1, and particularly well in Fig. 2. It will be seen that as the carrier moves along these rollers 16 will roll along the tracks 20 and so cause the supported pipes to rotate, and this continuous rotation of the pipes while they are drying insures that they will dry perfectly straight and not be subject to warping.

The track 20 ends short of the sprocket about which the carrier passes, and it will be noted that as soon as a roller runs off the end of the track it is entirely free to drop down, as clearly indicated in Figs. 1 and 2, with the result that the space between the roller and the end of the track finally becomes great enough to allow for the passage of the pipe, which then drops through from the upper pass to the next lower pass, which immediately carries it in the opposite direction until near the end of that pass it is dropped through the carrier and delivered to the next lower pass. Thus the pipe is caused to travel back and forth through the drying chamber at a comparatively slow rate of speed, the speed and the number of passes being so proportioned that by the time the pipe reaches the delivery end of the carrier and is ready to be discharged, it has been properly and completely dried. But, as has been heretofore said, if it is desired to repeat the drying process the guard 4 may be lowered and the pipes again sent through the drying chamber.

In order that the pipes as they are transferred from one pass of the carrier to another may not be injured by dropping the full distance between the passes, I have introduced a guard 25 swinging on the shaft 26 having a depending arm 27 with a wheel 28 which rides on the rollers 16. The parts are so arranged that just as a pipe is ready to drop through from an upper pass, a roller 16 has moved to a position to rock the guard 25, raising it to the position shown in Fig. 1, where a pipe may rest on the guard. As the carrier continues to travel, the roller 16 passes under the arm 27 permitting the guard to drop and the pipe to roll off of it between two of the rollers 16 of the next lower pass.

Where a transfer carrier is used it comprises a pair of spaced endless chains 30 moving about the sprockets 31, 31, and to opposite points on these chains are secured pairs of upstanding links 32, between which rods 33 are connected, the free ends of the links 32 being connected back to the chains by the straps 34, all of these connections being pivotal. The pipes drop from the lowest pass of the carrier into the pockets formed by these straps, rods and links, and may rest on a base 35 as they are moving along to a point where they are free to roll off into the boot 3 through which the conveyer E with its buckets 2 pass to pick the dry pipes up and carry them out of the drying chamber.

It will be seen that this transfer of the pipes from one pass of the carrier to the next adjacent lower pass permits of a very compact arrangement of the carrier, giving a maximum of capacity for the handling of articles, and it will also be seen that this arrangement is peculiarly adapted to the individual handling of articles. While, as has above been stated, this arrangement of the carrier is now believed to be the preferred arrangement, another type of carrier might be used, as illustrated in Fig. 3, where a plurality of endless chains are arranged in tier formation, one above the other, pipes being carried only on the upper run of each chain or belt as the case may be, and passing around the end of each run, and there delivered to the next lower pass.

In practice the conveyer should be made of very large capacity, and in an actual installation has been made to have 26 passes. The single conveyer which travels at a greater rate of speed than the carrier, delivers the wet articles to the drying chamber and removes the dried articles therefrom. The illustrated apparatus is particularly designed for the individual handling of articles, and the arrangement in combination with the parts has been adapted to this end.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

I claim as my invention:—

1. A carrier comprising flexible endless members, arms pivotally attached to said flexible members at spaced points, and transverse article supports rotatably carried by the free ends of said arms and being spaced apart to receive and support between them the articles to be conveyed.

2. A carrier comprising flexible endless members, arms pivotally attached to said flexible members at spaced points, transverse article supports carried by the free ends of said arms and spaced apart to receive and support between them articles to be conveyed, and tracks on which said supports ride, said tracks terminating short of a pass of the carrier to permit separation of the adjacent supports so that an article can pass down between them.

3. A carrier comprising tracks located one above another, a flexible member arranged at the sides of each track, transverse rotatable article supports pivotally connected with said flexible members and adapted to roll on said tracks, said supports being spaced apart to receive and support between them the articles conveyed, and means for releasing said supports at a predetermined point to permit the articles carried thereby to drop down between adjacent supports.

4. In an apparatus of the character described, a drying chamber, a slow-moving carrier located within said chamber, a faster moving conveyer extending into said chamber and moving adjacent the receiving and delivery ends of said carrier, and means for transferring articles from said carrier to said conveyer.

5. A traveling carrier arranged to move in a series of reverse passes one above another and having means for moving an article through one pass of said carrier and delivering it to the next lower pass, a vertically movable article receiving guard interposed between adjacent passes to transfer the article from one pass to the other, and means to move said guard.

6. A traveling carrier arranged to move in a series of reverse horizontal passes and having spaced apart supports upon which articles to be conveyed are positioned, means for transferring articles from one pass of the carrier to another, and a rockable pivotally mounted guard to transfer the articles from one pass to another, said guard being arranged in the path of said supports to be rocked thereby.

7. In an apparatus of the character described, a traveling carrier arranged in a series of reverse horizontal passes, supporting members forming a portion of said carrier, said members being spaced from one another to support an article between them, and means for separating adjacent supporting members short of the end of each pass.

8. A carrier comprising members regularly spaced apart from one another to receive and support articles between adjacent members, and means for perodically separating adjacent members to permit an article to pass down between them.

9. In an apparatus of the character described, a drying chamber, a traveling carrier located therein, a conveyer passing through and into said chamber and arranged to deliver articles to the receiving end of said carrier, and a transfer carrier arranged to receive articles from said first mentioned carrier and deliver them to said conveyer.

10. In an apparatus of the class described, a drying chamber, a traveling carrier located therein and having spaced apart supports between which articles to be conveyed are supported, and a conveyer passing through and into said chamber and having buckets the opposite faces of which are formed to carry the articles, said conveyer being arranged so that one face of the buckets support the articles as they are delivered to the carrier and the other face of the buckets support the articles after they are delivered from the carrier.

11. In an apparatus of the class described, a drying chamber, a slow moving carrier within said chamber and having spaced apart supports between which articles are positioned, a faster moving conveyer extending into said chamber and moving adjacent the receiving and delivery ends of said carrier, means external of the chamber for delivering articles to the conveyer, and means external of the chamber for receiving articles from the conveyer.

12. In an apparatus of the class described, a drying chamber, a slow moving carrier within said chamber and having spaced apart supports between which the articles are positioned, a faster moving conveyer extending into said chamber and moving adjacent the receiving and delivery ends of said carrier, said conveyer having buckets the opposite faces of which are adapted to support the articles conveyed, one face being adapted to support the articles as they are delivered to the carrier and the other face being adapted to support the articles after they are delivered from the carrier, means for delivering articles to the conveyer, and means for receiving articles from the conveyer.

HOWARD PARKER.